Oct. 2, 1962  R. T. CORNELIUS  3,056,273
BEVERAGE DISPENSER
Filed Nov. 9, 1960  3 Sheets-Sheet 1

INVENTOR
RICHARD T. CORNELIUS
BY
Caswell, Lagaard & Wicks
ATTORNEYS

Oct. 2, 1962 R. T. CORNELIUS 3,056,273
BEVERAGE DISPENSER
Filed Nov. 9, 1960 3 Sheets-Sheet 2
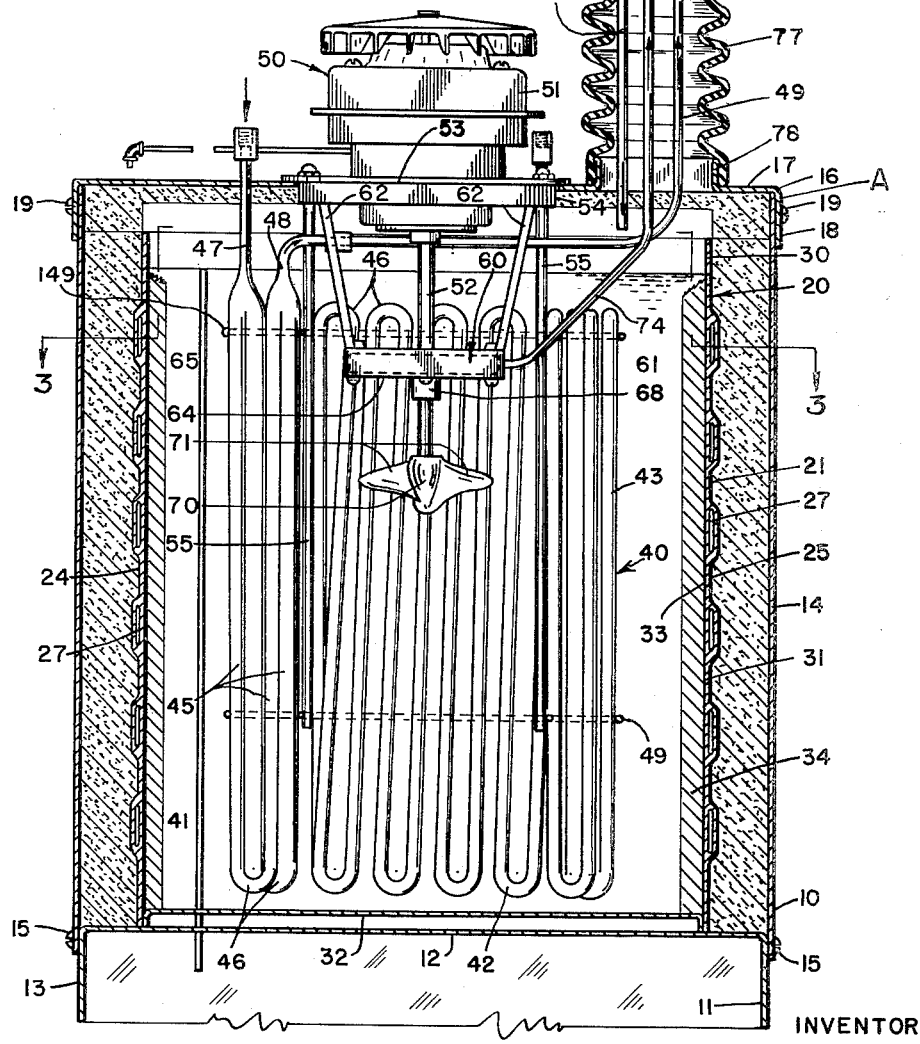
INVENTOR
RICHARD T. CORNELIUS
BY
Caswell Lagaard & Wicks
ATTORNEYS Oct. 2, 1962 R. T. CORNELIUS 3,056,273
BEVERAGE DISPENSER
Filed Nov. 9, 1960 3 Sheets-Sheet 3

INVENTOR
RICHARD T. CORNELIUS
BY
Caswell, Lagaard & Wicks
ATTORNEYS

United States Patent Office 3,056,273
Patented Oct. 2, 1962

3,056,273
BEVERAGE DISPENSER
Richard T. Cornelius, Minneapolis, Minn., assignor to The Cornelius Company, Minneapolis, Minn., a corporation of Minnesota
Filed Nov. 9, 1960, Ser. No. 68,250
7 Claims. (Cl. 62—393)

The herein disclosed invention relates to beverage dispensers and has for an object to provide a construction whereby beverage in large receptacles may be cooled and dispensed.

Another object of the invention resides in providing a construction in which a number of different beverages may be dispensed.

A still further object of the invention resides in providing a construction having a cooling unit and a dispensing unit in which the dispensing unit may be remotely positioned with reference to the cooling unit.

Another object of the invention resides in providing a construction for maintaining the dispensing unit cool and also the tubing leading to the dispensing unit.

Another object of the invention resides in providing a construction utilizing a cabinet and containing the cooling unit and in providing a cover for the cabinet removable therefrom and on which the operating parts of the cooling unit are mounted.

A still further object of the invention resides in providing a construction in which the beverage is cooled by means of an ice bank formed through refrigerating apparatus.

An object of the invention resides in providing a construction whereby the area of the heat exchange surface of the ice is kept substantially constant regardless of the volume of the ice.

Another object of the invention resides in providing a receptacle having a wall structure formed with passageways and through which a refrigerating fluid may be conducted.

A feature of the invention resides in maintaining water within the receptacle to form an ice bank on the walls thereof and in circulating the water in the receptacle to maintain the temperature of the water substantially constant.

Another object of the invention resides in providing a number of banks of tubing through which a number of beverages pass and in arranging said banks in spaced relation to the wall structure of the receptacle in a manner to form a central passageway therebetween and in further providing water circulating means within said passageway.

Other objects of the invention reside in the novel combination and arrangement of parts and in the details of construction hereinafter illustrated and/or described.

In the drawings:

FIGURE 2 is an elevational, sectional view taken on line 2—2 of FIGURE 1.

FIGURE 6 is a cross sectional view of the flexible conduit assembly of the invention taken on line 6—6 of FIGURE 2.

Figure 1:
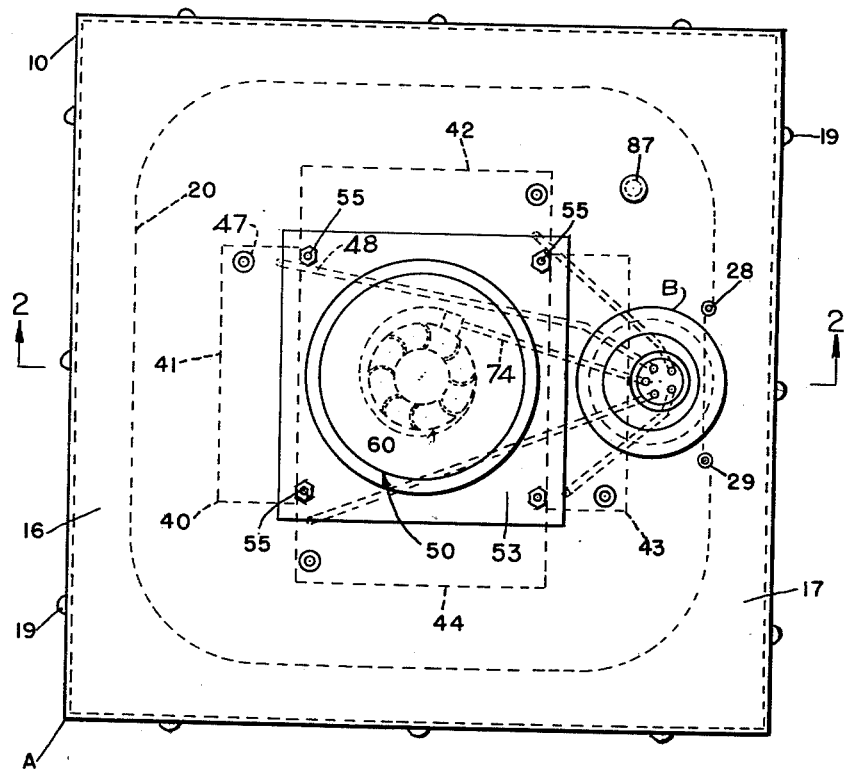
FIGURE 1 is a plan view of a beverage cooler illustrating an embodiment of the invention.

The invention comprises a cooling unit A and to which the beverage to be dispensed is fed from tanks or cans not shown and to a dispensing unit C which may be remotely disposed with reference to the cooling unit A and which is connected thereto by means of a flexible conduit assembly B. These parts will now be described in detail.

The cooling unit A comprises a cabinet 10 having a base 11 formed of sheet metal and provided with a bottom 12 and a flange 13 depending therefrom and extending about the perimeter thereof. The cabinet 10 further includes a lateral wall structure 14 which extends about the base 11 and is secured to the flange 13 by means of screws 15. The wall structure 14 is closed at its upper end by means of a cover 16 which is provided with a top 17 and which has a flange 18 extending downwardly therefrom. Flange 18 overlies the wall structure 14 and is secured thereto by means of screws 19.

Within the cabinet 10 is mounted a receptacle 20 which has a lateral wall structure 21 rectangular in form and constructed from sheet material bent to form side walls 22 and 23 and end walls 24 and 25 with rounded corners 26 therebetween. This wall structure is constructed from a particular type of sheet material having passageways 27 therein and which extend circumferentially about the same and are interconnected to leaders 28 and 29 and by means of which a refrigerant may be conducted to and from said passageways 27 for the purpose of cooling the entire surface 31 of said wall structure. The receptacle 20 is open at the top but closed at the lower end by means of a flanged bottom 32, brazed or soldered thereto. A suitable refrigerating compressor unit is mounted in proximity to the cabinet 10 and within the base 11 and serves to circulate the refrigerant through the passageway 27.

Within the interior of the receptacle 20 is mounted a heat exchange device 40 serving as beverage circulating means and comprising four banks of tubing 41, 42, 43 and 44. Each bank consists of a number of vertical reaches 45 with return bends 46 at the upper and lower ends of the same. Each bank has an inlet 47 and an outlet 48. The banks are arranged with certain of their corners meeting to provide a central rectangular water circulating passageway 39 therebetween and the vertical reaches are held together by means of retaining rods 149 welded or otherwise attached to the vertical reaches 45.

Immediately above the banks 41, 42, 43 and 44 is arranged a water circulating device 50 which consists of an electric motor 51 having a vertical rotor shaft 52 extending downwardly therefrom. The motor 51 has attached to it a support 53 in the form of a plate and which overlies an opening 54 in the top 17 of cover 16. The support 53 has four hangers 55 extending downwardly therefrom. These hangers are disposed in the reentrant angles of the passageway 39 adjacent the banks 41, 42, 43 and 44 and are welded or otherwise secured to the supporting rods 149.

Situated below the motor 51 is a liquid circulating pump 60 which has a case 61 comprising a bottom 64, an annular wall 65 and is closed at the top by means of a removable cover 66. The pump 60 is supported from the support 53 by means of four hangers 62 attached to the cover 66. The motor shaft 52 extends through a hole 67 in the cover 66 and is journalled in a bearing 68 on the bottom 64 of the pump. Mounted on the shaft 52 and disposed within case 61 is a centrifugal rotor 69 which forces water entering the case 61 through hole 67 outwardly and discharges it through an outlet 73 in the wall 65 of said case.

The shaft 52 extends for an appreciable distance below the bearing 68 and has mounted on it an impeller 70. This impeller has helical blades 71 which cause the water in the receptacle 20 to travel in an upward direction in the passageway 39.

Figure 5:
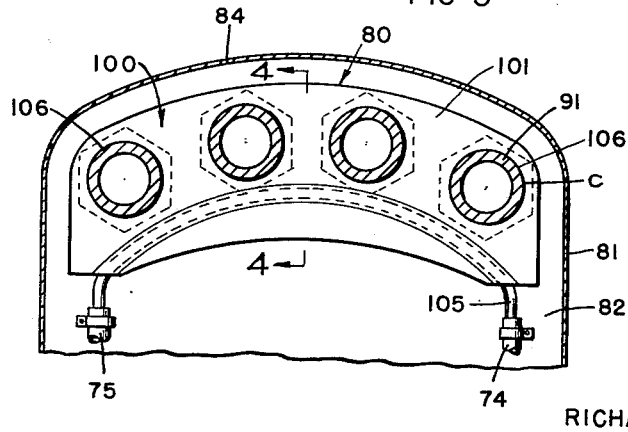
FIGURE 5 is a sectional view taken on line 5—5 of FIGURE 4.
Figure 3:
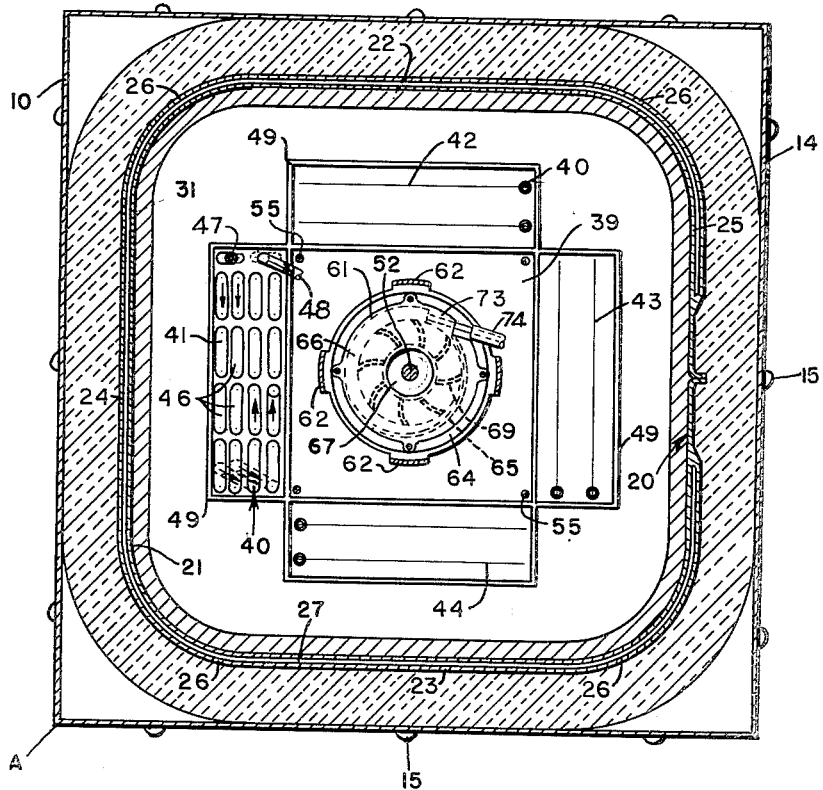
FIGURE 3 is a plan sectional view taken on line 3—3 of FIGURE 2.
Figure 4:
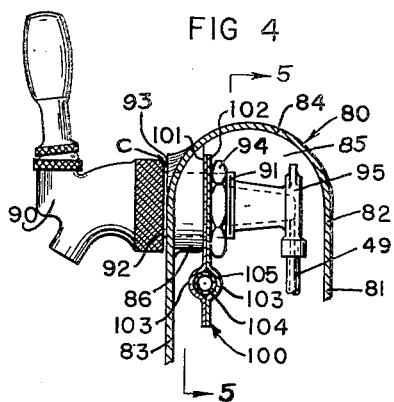
FIGURE 4 is a sectional view of the dispensing unit taken on line 4—4 of FIGURE 5.

For dispensing the beverages a dispensing device 80 is employed, best shown in FIGURES 4 and 5. This device comprises a case 81 constructed with a front 82, a back 83 and a curved lateral wall structure 84 therebetween. This case may be mounted on a counter not shown and has a chamber 85 within the same. Formed in the back 83 of the case 81 and near the upper portion of the same are four bosses 86 and which are drilled to receive the threaded shanks 91 of four faucets 90. These faucets may be of any suitable construction and the construction thereof not forming any feature of the invention will not be described. These faucets have shoulders 92 facing the front 82 and gaskets 93 encircle the shank 91 and are disposed between said shoulders and the face of the back 83.

Disposed within the chamber 85 is a cooling unit 100 which consists of two overlying plates 101 and 102. These plates have facing offsets 103 which form a groove 104 therebetween and in which is disposed a heat conducting tube 105. These parts are soldered together or otherwise secured to form a heat absorbing structure for cooling the faucets 90. The plates 101 and 102 have holes 106 formed in them and which receive the shanks 91 of the faucets 90. The plate 101 butts up against the inner surfaces of the bosses 86 and nuts 94 screwed on the shanks 91 of said faucets clamp the faucets in position on the wall 83 of case 81.

The inlets 47 of the banks 41, 42, 43 and 44 are connected to suitable pressurized containers containing the beverages to be dispensed and which forming no feature of the invention have not been shown. The outlets 48 from the banks 41, 42, 43 and 44 are connected to flexible plastic tubes 49 which in turn are connected to the inner ends of the shanks 91 of faucets 90 by means of tube connectors 95 attached to said shanks. The outlet 73 of pump 60 is connected by a flexible plastic tube 74 to one end of the tube 105 of the cooling unit 100. The other end of tube 105 is connected to another plastic tube 75 which discharges into the interior of receptacle 20 and through the top 17 of cabinet 10. All of these tubes are run in a flexible rubber or similar casing 76, forming the conduit assembly B. An accordion type flexible sleeve 77 encircles and is attached to an annular flange 78 issuing upwardly from the top 17 of cover 16. This sleeve is also attached to the casing 76 of conduit assembly B, and encases the tubes disposed therein.

The method of using the invention is as follows:

The receptacle 20 is filled with water through the filler cap 87 and to a height a little above the uppermost portions of the banks of tubes 41, 42, 43 and 44. Refrigerant is then directed through the passageway 27 in the wall structure 21 of receptacle 20 and cooling of the same commences. Motor 51 is then set in operation; and the impeller 70 circulates the water in receptacle 20, causing it to travel upwardly through passageway 39 between the sand banks of tubes through the upper portions of the same and downwardly along the inner surface 33 of the wall structure 21 of receptacle 20. As the temperature of the water is lowered, ice forms on the said surface and builds up to a suitable thickness, as indicated at 34 in FIGURE 2. When a sufficient thickness of ice has been produced, the refrigerating apparatus is stopped either manually or automatically. The motor 51, however, continues to run and circulates the water about the various banks of tubes 41, 42, 43 and 44. At the same time, the pump 60 draws water from the water in the receptacle 20 through the hole 67 therein and discharges it through tube 74. This tube being constructed of insulating material, such as polyethylene, causes very little loss of temperature. The cool water entering said tube follows through the tube 105 in the cooling unit 100 and cools the plate 101. This causes cooling of the faucets and maintains the faucets sufficiently cool to prevent warming up of the beverage when the same reaches a faucet after the apparatus has been standing idle for some time. As beverage is drawn from the various faucets, the banks of tubes are gradually heated up and transmit the heat absorbed to the water in the receptacle 20. This melts the ice in the bank 34. Consumption of the ice so formed continues until the thickness of the ice bank 34 is reduced to the minimum preferred thickness. The compressor of the refrigerating apparatus is then started, and the same causes the forming of additional ice on the remaining ice bank and builds the same up to the original thickness.

Due to the fact that the ice forming the ice bank is formed on a sheet-like wall structure of the beverage dispenser, the area of ice cooling the various banks of tubes remains practically the same regardless of the thickness of the ice. In this manner uniform cooling is at all times procured.

The invention is advantageous in that a single motor operates both the water circulation for the cooling of the beverages as well as for the maintaining of the faucets cool. The length of the cable B may be varied to suit the requirements of every particular installation, so that a single type of construction may be employed for different installations. The dispenser can be constructed at a nominal expense and has but a minimum number of parts requiring attention.

Other objects of the invention reside in the novel combination and arrangement of parts and in the details of construction hereinafter illustrated and/or described.

Having described the invention, what is claimed as new and desired to be protected by Letters Patent is:

1. In a beverage cooling unit a rectangular receptacle containing water and having a lateral wall structure forming the sides and ends of said receptacle, means forming refrigerant conducting passageways extending about and throughout said lateral wall structure and cooling the water in said receptacle below freezing to form an ice bank on said wall structure of substantially uniform thickness throughout, and a beverage heat exchange device completely immersed in the water in said receptacle and having a heat exchange surface substantially uniformly spaced from said ice bank and parallel therewith, said heat exchange device falling short of the bottom and upper portion of the receptacle and being provided with a central water circulating passageway therethrough and water circulating means within said passageway causing water to flow past the ice bank and through the passageway to transfer heat from the heat exchange device and to said ice bank.

2. In a beverage cooling unit a rectangular receptacle containing water and having a lateral wall structure forming the sides and ends of said receptacle, means forming refrigerant conducting passageways extending about and throughout said lateral wall structure and cooling the water in said receptacle below freezing to form an ice bank on said wall structure of substantially uniform thickness throughout, and a beverage heat exchange device completely immersed in the water in said receptacle and having a heat exchange surface substantially uniformly spaced from said ice bank to form an annular passageway therebetween, said heat exchange device falling short of the bottom and upper portion of the receptacle and being provided with a central water circulating passageway therethrough and water circulating means within said central passageway causing water to flow through said passageways and to absorb heat from said heat transfer device and transfer it to said ice bank.

3. In a beverage cooling unit a rectangular receptacle containing water and having a lateral wall structure forming the sides and ends of said receptacle, means forming refrigerant conducting passageways extending about and throughout said lateral wall structure and cooling the water in said receptacle below freezing to form an ice bank on said wall structure of substantially uniform thickness throughout, and a beverage heat exchange device comprising four heat exchange banks of tubing having oppositely facing heat exchange surfaces and arranged with one set of heat exchange surfaces parallel with and spaced from the heat exchange surfaces of said receptacle to form an annular water circulating passageway therebetween and arranged so that their other heat exchange surfaces, form a central water circulating passageway within the same and means for circulating the water within said receptacle through said passageways.

4. In a beverage cooling unit a rectangular receptacle containing water and having a lateral wall structure forming the sides and ends of said receptacle, means forming refrigerant conducting passageways extending about and throughout said lateral wall structure and cooling the water in said receptacle below freezing to form an ice bank on said wall structure of substantially uniform thickness throughout, and a beverage heat exchange device comprising four heat exchange banks of tubing having oppositely facing heat exchange surfaces and arranged with one set of heat exchange surfaces parallel with and spaced from the heat exchange surfaces of said receptacle to form an annular water circulating passageway therebetween and arranged so that their other heat exchange surfaces, face one another and form a central water circulating passageway within the same and means disposed within said central water circulating passageway for causing flow of water through both of said water circulating passageways.

5. In a beverage dispenser having a cooling unit provided with a heat exchange device and utilizing a refrigerated receptacle containing a cooling liquid for cooling the same and a dispensing unit including a faucet and remotely positioned from the cooling unit, a flexible conduit assembly extending between said units and containing a beverage conducting conduit connected to said cooling device and to said faucet, a heat exchange device in heat transfer relation with said faucet, said conduit assembly further including a cooling conduit running along said beverage conducting conduit and receiving cooling liquid from said cooling unit, said cooling conduit being connected to said second named heat exchange device, said heat exchange device having a water circulating passageway therethrough, a motor, water circulating means driven by said motor and mounted in said passageway and a pump driven by said motor and circulating cooling water through said cooling conduit.

6. In a beverage cooling unit a rectangular receptacle containing water and having a lateral wall structure forming the sides and ends of said receptacle, means forming refrigerant conducting passageways extending about and throughout said lateral wall structure and cooling the water in said receptacle below freezing to form an ice bank on said wall structure of substantially uniform thickness throughout, and a beverage heat exchange device comprising four heat exchange banks of tubing having oppositely facing heat exchange surfaces and arranged with one set of heat exchange surfaces parallel with and spaced from the heat exchange surfaces of said receptacle to form an annular water circulating passageway therebetween and arranged so that their other heat exchange surfaces, form a central water circulating within the same and means disposed within said central water circulating passageway for causing flow of water through both of said water circulating passageways, means receiving cooling liquid from said cooling unit, said cooling conduit being connected to said second named heat exchange device, said first named heat exchange device having a vertical passageway therethrough, a motor positioned above said first named heat exchange device and having a shaft extending into said vertical passageway, means on said motor shaft causing circulation of the water through said passageway and a pump driven by said shaft and circulating water through cooling conduit.

7. In a beverage cooling unit a rectangular receptacle containing water and having a lateral wall structure forming the sides and ends of asid receptacle, means forming refrigerant conducting passageways extending about and throughout said lateral wall structure and cooling the water in said receptacle below freezing to form an ice bank on said wall structure of substantially uniform thickness throughout, and a beverage heat exchange device comprising four heat exchange banks of tubing having oppositely facing heat exchange surfaces and arranged with one set of heat exchange surfaces parallel with and spaced from the heat exchange surfaces of said receptacle to form an annular water circulating passageway therebetween and arranged so that their other heat exchange surfaces form a central water passageway within the same, remotely positioned beverage dispensing means, cooling means for cooling said dispensing means, a conduit connected to said cooling means, a motor positioned above said beverage heat exchange device and having a shaft extending into said central water circulating passageway, means on said motor shaft causing circulation of water through said central water circulating passageway in one direction and through said annular passageway in the opposite direction and means operated by said shaft and causing flow of water through said conduit.

References Cited in the file of this patent
UNITED STATES PATENTS

| 1,881,725 | Leibing | Oct. 11, 1932 |
| 2,259,852 | Hall | Oct. 21, 1941 |
| 2,362,104 | Smith | Nov. 7, 1944 |
| 2,713,248 | Cann et al. | July 19, 1955 |
| 2,860,492 | Kuebler | Nov. 18, 1958 |
| 2,951,352 | Nicholson | Sept. 6, 1960 |